March 4, 1958 F. W. BAUR 2,825,517
SUPPORT STRUCTURE FOR SENSITIVE INSTRUMENTS
Filed Dec. 15, 1953
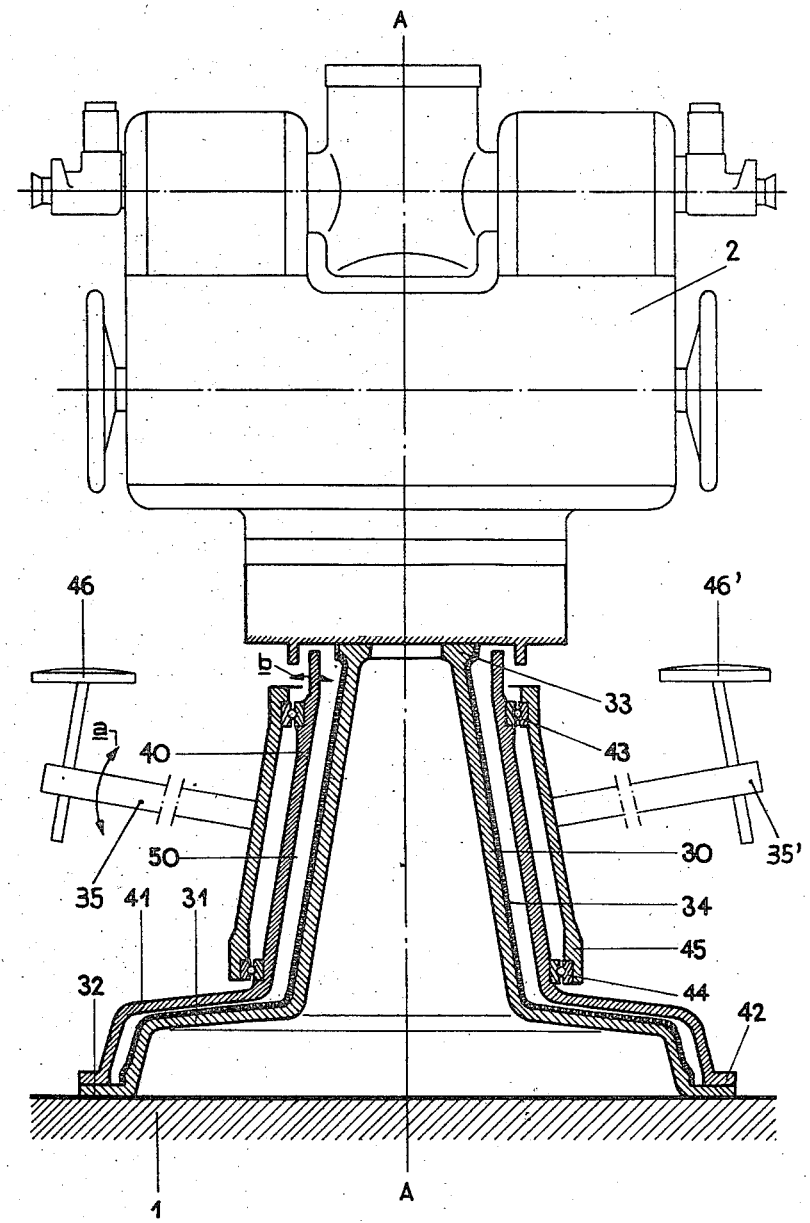
INVENTOR:
FRANZ W. BAUR
BY:

United States Patent Office 2,825,517
Patented Mar. 4, 1958

2,825,517

SUPPORT STRUCTURE FOR SENSITIVE INSTRUMENTS

Franz W. Baur, St.-Aubin Sauges, Neuchatel, Switzerland, assignor to Firma Contraves A. G., Zurich, Switzerland Application December 15, 1953, Serial No. 398,390

10 Claims. (Cl. 248—158)

The present invention relates to a supporting device. More particularly, the present invention relates to a combined support arrangement for supporting a measuring instrument, such as a theodolite, and for carrying personnel using the measuring instrument.

It is an object of the present invention to provide a supporting arrangement of the above type which affords accurate operation of the measuring instrument.

It is another object of the present invention to provide a stable support for the measuring instrument even when a support for the user thereof is associated therewith.

It is still another object of the present invention to provide a supporting arrangement of the above type wherein transmission of disturbing influences to the support standard of the measuring instrument is avoided.

Other objects and advantages will become apparent from the following description and the appended claims.

The present invention is particularly concerned with a support device of the type which is provided with a carrying member for the user of the instrument, the carrying member being, for example, a seat device. In such supports, it is particularly important that the measuring instrument, e. g., a theodolite, occupy a practically unchangeable starting position. When such a measuring instrument is used to exactly determine within a few seconds of arc, for example, the position of fixed or movable objects with respect to particular reference directions, as, for example, the azimuth or the altitude of the object, such measurement is possible only if the supporting standard carrying the measuring instrument is extremely stable, and is kept free from the smallest bending influences.

It is relatively easy to arrange the parts of the measuring instrument so that the instrument is statically and dynamically balanced with respect to its vertical supporting axis and to mount the supporting standard of the instrument in a stable manner by securing it to a solid base, as, for example, by providing the standard at its bottom with a concrete plate, in order to attain the necessary precision in the operation of the measuring instrument. However, when a carrying member for supporting the operator of the instrument must be provided on the support, as is generally the case where the measuring instrument is used for continuous measurement of movable objects, so that, for example, the observer may continuously look through the oculars of the instrument, the maintenance of necessary precision becomes considerably more difficult. In particular, the differences in weight of individual operators of the instrument and their voluntary and involuntary movements give rise to bending moments on the supporting standard, which can be overcome only by constructing the supporting standard with excessively large dimensions, in order to attain the necessary precision in the use of the measuring instrument. Furthermore, an increase of the amount of material in the body of the supporting standard made necessary thereby results in an increase of the heat expansion effects in the supporting standard, which further unfavorably influences the precision of the measurements.

The present invention is designed to overcome the above mentioned difficulties, and to afford the objects stated above.

With the above objects in view, the present invention mainly comprises a combined support structure for a measuring instrument and the user thereof which includes an inner supporting standard for supporting a measuring instrument, the supporting standard having a base portion at its lower end and an instrument carrying portion spaced from the base portion thereof, and an outer supporting member arranged radially outwardly of the inner supporting standard for carrying the user of the measuring instrument, the outer supporting member having a base portion at its lower end and a carrying portion spaced from the base portion thereof, the inner supporting standard and the outer supporting member being connected to each other solely at the base portions thereof, whereby stresses exerted on the outer supporting member are not transmitted to the instrument carrying portion of the inner supporting standard.

Preferably, in accordance with the present invention, the outer supporting member is arranged coaxial with the inner supporting standard and is spaced therefrom along its length, so as to provide an annular air space between the inner and outer supporting parts.

In accordance with the invention, a carrying member for carrying the user of the measuring instrument is provided on the outer supporting member and mounted thereon for rotation about the inner and outer supporting components. Preferably, both the inner and outer support elements are of tubular form and have an enlarged base portion on the bottom of which radial flanges are formed, the inner supporting standard and the outer supporting member being connected to each other only at their radial flanges.

In this way, the carrying member, which is mounted on the outer supporting member for rotation thereon about the central vertical axis of the combined support structure, may carry an operator circumferentially around the instrument support without transmitting the stresses exerted thereon to the supporting standard carrying the instrument, and thereby the stability of the instrument supporting standard is considerably improved. Furthermore, the outer supporting member serves as a protective shell for the inner supporting standard to guard against non-uniform heating effects, which may cause bending or deformation of the inner supporting standard. To further protect the outer surface of the inner supporting standard from heat effects, the surface of the inner supporting standard may be covered with a heat reflective and/or a heat insulating layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The figure is a view in elevation partly in section of an embodiment of a support device constructed in accordance with the present invention.

Referring now to the figure, a stationary base or pedestal 1, which may, for example, be formed of a concrete plate poured on the ground, is shown carrying a supporting structure for a measuring apparatus 2, which may be, for example, a theodolite or other type of surveying instrument, which is intended to be used for carrying out precision measurements of movable objects. The supporting structure for the measuring instrument 2 comprises an axially symmetrical inner hollow column 30 having an enlarged bell-shaped base portion 31 which is formed with a radially extending annular flange 32. The bottom of flange 32 forms a bearing surface for the entire supporting structure against the stationary base plate 1. On the upper carrier ring 33 of the inner supporting standard 30 there is mounted the measuring instrument 2 which is enabled to rotate with respect to vertical axis A—A by means of parts not shown. It is assumed that the parts of measuring instrument 2 are balanced statically as well as dynamically with respect to axis A—A, so that no objectionable bending moments with respect to axis A—A are caused thereby.

The upper side of the base flange 32 forms a supporting surface for a base flange 42 which is formed on an enlarged bell-shaped base portion 41 of an outer axially symmetrical tubular supporting column 40, which co-axially surrounds the inner supporting column 30 and which is spaced therefrom along its entire height by an annular air space 50.

A tubular carrying sleeve 45 is rotatably mounted on the outer supporting member 40 by means of two bearing rings 43 and 44. The sleeve 45 constitutes a carrying member for seats 46—46' on which operating personnel may be carried and be rotated thereon around axis A—A with measuring instrument 2, seats 46—46' being connected to sleeve 45 by members 35—35'. In addition to seats 46—46', other supplementary apparatus may be mounted on the turnable carrying member 45, such as driving motors, and gear systems can be provided between measuring apparatus 2 and the turnable carrying member 45. In this case, care should be taken that such gear systems do not cause deflecting moments on the inner supporting standard 30 with respect to axis A—A.

Due to the fact that outer supporting member 40 is in contact with inner supporting standard 30 only at their respective base flanges 32 and 42, any bending or deformation of outer supporting member 40 cannot be transmitted to the inner supporting standard 30. Bending moments caused by weight resting on seats 46—46' are indicated in the drawing by the arrows *a* and *b* which show the direction of motion of member 35 connecting seat 46 with outer supporting member 40 and the relative motion of member 40 itself, due to weight exerted on seats 46—46'.

In addition, outer supporting tubular member 40 protects inner supporting standard 30 effectively against outside heat influences. Such protection of inner supporting standard 30 against heat influences can be further enhanced by providing the outer surface of inner standard 30 with a heat protective layer 34, which, for example, may be formed of glass wool material to serve as an insulating layer and a metal foil layer, e. g., of aluminum, to serve as a ray reflecting means. Any unsymmetrical heat effects which remain even after such protection are dispersed rapidly throughout the entire support structure due to the formation of the inner standard 30 as a bell-shaped axially symmetrical tubular body.

It has been found that the above construction principle, in accordance with which the carrier members for the operating personnel are mounted on a special supporting member, the deformations of which cannot be transmitted to the supporting standard of the measuring instrument, results in measurement precision which is greatly improved over that which is obtainable with supporting structures known heretofore.

It will be understood that each of the elements described above, or two or more together, may also find a useful application in other types of support structures differing from the types described above.

While the invention has been illustrated and described as embodied in a support for a surveying instrument, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A combined support structure for a sensitive instrument which should remain stable and the operator thereof, comprising, in combination, an inner instrument supporting structure having an instrument carrying upper portion and a lower base portion; an outer operator carrying structure arranged about said inner supporting structure and having an upper portion spaced from said instrument carrying upper portion of said inner instrument supporting structure, an operator carrier portion connected to said upper portion, and a lower base portion integral with said latter upper portion; and connecting means integrally formed with said base portions of said instrument support structure and said operator support structure, respectively, for connecting said inner instrument supporting structure and said outer operator carrying structure to each other solely at their base portions without transmitting stresses exerted on said outer operator carrying structure to the instrument carrying portion of said inner instrument carrying structure.

2. A combined support structure for a sensitive instrument which should remain stable and the operator thereof, comprising, in combination, an inner instrument supporting structure having an instrument carrying upper portion and a lower base portion; an outer operator carrying structure arranged about and coaxial with said inner supporting structure and having an upper portion spaced from said instrument carrying upper portion of said inner instrument supporting structure, said outer operator carrying structure having also an operator carrier portion connected to said upper portion thereof, and a lower base portion integral with said upper portion thereof; and connecting means integrally formed with said base portions of said instrument support structure and said operator support structure, respectively, for connecting said inner instrument supporting structure and said outer operator carrying structure to each other solely at their base portions without transmitting stresses exerted on said outer operator carrying structure to the instrument carrying portion of said inner instrument carrying structure.

3. A combined support structure for a sensitive instrument which should remain stable and the operator thereof, comprising, in combination, an inner instrument supporting structure having an instrument carrying upper portion and a lower base portion; an outer operator carrying structure arranged about and coaxial with said inner supporting structure and covering substantially the whole length thereof, said outer operator carrying structure having an upper portion spaced from said instrument carrying upper portion of said inner instrument supporting structure, said outer operator carrying structure having also an operator carrier portion connected to said upper portion thereof, and a lower base portion integral with said upper portion thereof; and connecting means integrally formed with said base portions of said instrument support structure and said operator support structure, respectively, for connecting said inner instrument supporting structure and said outer operator carrying structure to each other solely at their base portions without transmitting stresses exerted on said outer operator carrying structure to the instrument carrying portion of said inner instrument carrying structure.

4. A combined support structure for a sensitive instrument which should remain stable and the operator thereof, comprising, in combination, an inner instrument supporting structure having an instrument carrying upper portion and a lower base portion; an outer operator carrying structure arranged about and coaxial with said inner supporting structure covering substantially the whole length thereof and separated from the same for substantially the whole length by an air space, said outer operator carrying structure having an upper portion spaced from said instrument carrying upper portion of said inner instrument supporting structure, said outer operator carrying structure having also an operator carrier portion connected to said upper portion thereof, and a lower base portion integral with said upper portion thereof; and connecting means integrally formed with said base portions of said instrument support structure and said operator support structure, respectively, for connecting said inner instrument supporting structure and said outer operator carrying structure to each other solely at their base portions without transmitting stresses exerted on said outer operator carrying structure to the instrument carrying portion of said inner instrument carrying structure.

5. A combined support structure for a sensitive instrument which should remain stable and the operator thereof, comprising, in combination, an inner instrument support standard having an upper instrument carrying portion in form of a hollow column having a central axis and a bell-shaped lower base portion integral with said upper portion and ending in a radially extending flange; an outer operator carrying standard arranged about and coaxial with said inner instrument support standard, covering substantially the whole length thereof and separated from the same for substantially the whole length by an air space, said outer operator carrying standard having an upper portion in form of a hollow column and a bell-shaped lower base portion integral with said upper portion and ending in a radially extending flange; and a shell formed with operator supports arranged around and connected to said upper portion of the outer operator carrying standard for rotation around said central axis, said inner instrument supporting standard and said outer operator carrying standard connected to each other solely at their radially extending flanges, whereby stresses exerted on said outer shell are not transmitted to the instrument carrying portion of said instrument carrying standard.

6. A combined support structure for a sensitive instrument which should remain stable and the operator thereof, comprising, in combination, an inner instrument support standard having an upper instrument carrying portion in form of a hollow column having a central axis and a bell-shaped lower base portion integral with said upper portion and ending in a radially extending flange having an upper face and a lower face, the latter resting on a base; an outer operator carrying standard arranged about and coaxial with said inner instrument support standard, covering substantially the whole length thereof and separated from the same for substantially the whole length by an air space, said outer operator carrying standard having an upper portion in form of a hollow column and a bell-shaped lower base portion integral with said upper portion and ending in a radially extending flange having a lower face resting on said upper face of the flange of the inner supporting standard; and a shell formed with operator supports arranged around and connected to said upper portion of the outer operator carrying standard for rotation around said central axis, said inner instrument supporting standard and said outer operator carrying standard connected to each other solely at their radially extending flanges, whereby stresses exerted on said outer shell are not transmitted to the instrument carrying portion of said instrument carrying standard.

7. A combined support structure for a sensitive instrument which should remain stable and the operator thereof, comprising, in combination, an inner instrument support standard having an upper instrument carrying portion in form of a hollow column having a central axis and a bell-shaped lower base portion integral with said upper portion and ending in a radially extending flange having an upper face and a lower face, the latter resting on a base; an outer operator carrying standard arranged about and coaxial with said inner instrument support standard, covering substantially the whole length thereof and separated from the same for substantially the whole length by an air space, said outer operator carrying standard having an upper portion in form of a hollow column and a bell-shaped lower base portion integral with said upper portion and ending in a radially extending flange having a lower face resting on said upper face of the flange of the inner supporting standard; and a shell formed with laterally extending arms carrying operator seats arranged around and connected to said upper portion of the outer operator carrying standard for rotation around said central axis, said inner instrument supporting standard and said outer operator carrying standard connected to each other solely at their radially extending flanges, whereby stresses exerted on said outer shell are not transmitted to the instrument carrying portion of said instrument carrying standard.

8. A combined support structure for a sensitive instrument which should remain stable and the operator thereof, comprising, in combination, an inner instrument support standard having an upper instrument carrying portion in form of a hollow column having a central axis and a bell-shaped lower base portion integral with said upper portion and ending in a radially extending flange; an outer operator carrying standard arranged about and coaxial with said inner instrument support standard, covering substantially the whole length thereof and separated from the same for substantially the whole length by an air space, said outer operator carrying standard having an upper portion in form of a hollow column and a bell-shaped lower base portion integral with said upper portion and ending in a radially extending flange; a shell formed with operator supports arranged around and connected to said upper portion of the outer operator carrying standard for rotation around said central axis, said inner instrument supporting standard and said outer operator carrying standard connected to each other solely at their radially extending flanges, whereby stresses exerted on said outer shell are not transmitted to the instrument carrying portion of said instrument carrying standard; and heat insulating means arranged between said inner instrument supporting standard and said outer operator carrying standard.

9. A combined support structure for a sensitive instrument which should remain stable and the operator thereof, comprising, in combination, an inner instrument support standard having an upper instrument carrying portion in form of a hollow column having a central axis and a bell-shaped lower base portion integral with said upper portion and ending in a radially extending flange; an outer operator carrying standard arranged about and coaxial with said inner instrument support standard, covering substantially the whole length thereof and separated from the same for substantially the whole length by an air space, said outer operator carrying standard having an upper portion in form of a hollow column and a bell-shaped lower base portion integral with said upper portion and ending in a radially extending flange; a shell formed with operator supports arranged around and connected to said upper portion of the outer operator carrying standard for rotation around said central axis, said inner instrument supporting standard and said outer operator carrying standard connected to each other solely at their radially extending flanges, whereby stresses exerted on said outer shell are not transmitted to the instrument carrying portion of said instrument carrying standard; and a heat insulating layer covering substantially the whole outer surface of said inner instrument supporting standard.

10. A combined support structure for a sensitive instrument which should remain stable and the operator thereof, comprising, in combination, an inner instrument support standard having an upper instrument carrying portion in form of a hollow column having a central axis and a bell-shaped lower base portion integral with said upper portion and ending in a radially extending flange; an outer operator carrying standard arranged about and coaxial with said inner instrument support standard, covering substantially the whole length thereof and separated from the same for substantially the whole length by an air space, said outer operator carrying standard having an upper portion in form of a hollow column and a bell-shaped lower base portion integral with said upper portion and ending in a radially extending flange; a shell formed with operator supports arranged around and connected to said upper portion of the outer operator carrying standard for rotation around said central axis, said inner instrument supporting standard and said outer operator carrying standard connected to each other solely at their radially extending flanges, whereby stresses exerted on said outer shell are not transmitted to the instrument carrying portion of said instrument carrying standard; and a ray reflecting layer covering substantially the whole outer surface of said inner instrument supporting standard.

References Cited in the file of this patent

UNITED STATES PATENTS

| | | |
|---|---|---|
| 1,368,132 | Gavlak | Feb. 8, 1921 |
| 1,380,193 | Dinguid | May 31, 1921 |
| 2,027,348 | Procofieff-Seversky | Jan. 7, 1936 |

FOREIGN PATENTS

| | | |
|---|---|---|
| 84,004 | Austria | May 25, 1921 |